United States Patent

Phaneuf et al.

[11] 4,011,007
[45] Mar. 8, 1977

[54] OPTICAL FIBER BUNDLE IMAGE CONDUIT

[75] Inventors: Roland A. Phaneuf, Sturbridge; Richard R. Strack, Southbridge, both of Mass.

[73] Assignee: American Optical Corporation, Southbridge, Mass.

[22] Filed: Dec. 27, 1973

[21] Appl. No.: 428,967

Related U.S. Application Data

[63] Continuation of Ser. No. 157,217, June 28, 1971, abandoned.

[52] U.S. Cl. .............................. 350/96 BC; 65/4 B
[51] Int. Cl.² ......................................... G02B 5/16
[58] Field of Search ................. 350/96 B; 65/3, 4

[56] References Cited

UNITED STATES PATENTS

| | | | |
|---|---|---|---|
| 3,004,368 | 10/1961 | Hicks | 350/96 B X |
| 3,190,735 | 6/1965 | Kapany | 350/96 B X |
| 3,253,896 | 5/1966 | Woodcock et al. | 350/96 B X |
| 3,279,902 | 10/1966 | Gardner | 350/96 B X |
| 3,279,942 | 10/1966 | Granitsas et al. | 350/96 B X |
| 3,574,582 | 4/1971 | Siegmund et al. | 350/96 B X |
| 3,653,739 | 4/1972 | Strack | 350/96 B X |
| 3,690,853 | 9/1972 | Law | 350/96 B X |
| 3,754,879 | 8/1973 | Phaneuf | 350/96 B X |

Primary Examiner—David H. Rubin
Attorney, Agent, or Firm—H. R. Berkenstock, Jr.; William C. Nealon

[57] ABSTRACT

A plurality of optical glass cores of selected refractive index and dimension are clad with a first glass of lower refractive index providing substantially total internal reflection within the cores. The clad cores are then clad with a glass displaying a lower viscosity than either the core or the first cladding and fused into a final assembly. The cross-sectional area of the second core cladding is selected to provide a minimum free space within the fused assembly.

4 Claims, 7 Drawing Figures

INVENTOR.
Roland A. Phaneuf
Richard R. Strack
BY
Attorney

OPTICAL FIBER BUNDLE IMAGE CONDUIT

This is a continuation of application Ser. No. 157,217 filed June 28, 1971, now abandoned.

BACKGROUND OF THE INVENTION

The present invention relates generally to fiber optics and in particular to a fused fiber optical conduit displaying relatively blemish-free transmission qualities.

Fiber optics is based on the ability of smooth fibers of transparent materials such as glass to conduct light with high efficiency by means of multiple internal reflections and concomitantly the ability of each fiber in an array or bundle to conduct this light independently of its neighbors and without significant loss.

When light is incident at the interface between two dielectric media of different refractive index it will be totally reflected from the higher index surface for all angles of incidence greater than a specified critical angle related to the refractive indices of the two media. In actual practice, one finds that minute defects and contamination of the fiber surfaces interferes greatly with the total reflection phenomena by absorbing and scattering a fraction of the incident light thereby causing attenuation of the transmitted light and the appearance of blemishes on the viewing surface.

In addition to that caused by contamination and surface defects there is further loss of energy when the fiber cores come into intimate contact or within a distance of each other less than a wavelength of the transmitted light. This loss phenomena which is related to the tunnel effect of quantum mechanics is due to the finite penetration of electromagnetic waves into the rarer medium during conditions of total internal reflection. While the extent of this penetration is only in the order of a wavelength of light, should the adjacent fiber come within this distance then it will absorb the transmitted light and to that extent destroy the desired internal reflection.

The elimination of losses due to the aforementioned problems has, of course, been the object of much prior art. To a great extent the use of core cladding has obviated these defects and greatly improved the transmission qualities of the optical fibers. The use of cladding materials in intimate contact with the surface of the fiber cores provide a contaminant free core separated from its neighboring core by a distance equal to at least twice the thickness of the cladding material. In all instances this cladding material is kept within a range of thickness substantially greater than the wavelength of the light being transmitted and thusly prevents any cross talk or absorption of light by the neighboring fiber.

Despite the use of core claddings a significant number of blemishes still appear on the viewing surface of fiber optic arrays due to distortion of the core surfaces. When the core surface is disturbed it changes the angle of incidence of the light internal to the core thereby causing a portion of the transmitted light to have an angle of incidence less than the critical angle allowing its transmission through the wall of the fiber and its ultimate loss. Primarily these distortions of the core surface are the result of projections formed on the surface of neighboring cores during the fusion process. As the arrays of fiber cores are heated and drawn toward their ultimate desired dimensions, various random inclusions of foreign materials, etc. are vaporized causing the cladding to expand to a volume commensurate with the force developed. When this expanding volume or void forms at a point of contact with the neighboring fiber, the protrusion deforms the neighboring core surface. The effect of core surface deformations in producing blemishes or dark spots on the image surface of the fiber optic conduit is amply detailed and explained in United States patent application Ser. No. 51,784, filed July 2, 1970 entitled "Method of Producing An Improved Leachable Bundle of Optical Fibers and the Product Thereof", now U.S. Pat. No. 3,653,739 issued Apr. 4, 1972 of the same assignee as this application. The referenced application clearly demonstrates the effect of the bubbles or deformed surface of the fiber optic core on the transmission of light and its deleterious effect upon the transmission characteristics of the conduit.

Due to the high frequency of occurrence of blemishes in optical fiber conduits of practical length this problem seriously affects the transmission capacity of optical fibers in use today. The basis for this high defect rate is found mainly in the efforts made to increase the number of usable fibers within a given conduit. Obviously any increase in usable fibers within a conduit must add to the total information capacity or transmission capacity of the conduit itself. As the density of the fibers per unit of cross-sectional area of the conduit becomes higher, the contact surface of adjacent fibers increases. By this is meant that as the forces pressing radially inward become greater the fibers themselves tend to distort and adjacent fibers now contact each other along a rather large surface of the fiber as opposed to a point contact which may be maintained in a loosely packed or fused assembly. In addition free space within the bundle is eliminated or greatly diminished. Therefore as bubbles form there is no free volume to which they may travel and thus must produce pressures on the surface of the cores themselves thereby resulting in deformation of the core surface when forces associated with these bubbles becomes sufficiently high.

In the afore-referenced United States application, there is presented a method which obviates core distortion due to the formation of bubbles or voids in the glass cladding of the fibers. This improvement is attained by mounting on the circumferential periphery of the fibers a number of longitudinal rods fused to the exterior of the cladding. These rods are positioned with respect to each other in the bundle to maintain a certain separation between the fibers and to minimize the area of contact between the fibers, i.e. the contact area is limited to the surface area of the rod extending along the length of the fiber. This innovation accomplishes two central purposes. It maintains a certain amount of free space to which the bubbles may migrate and also minimizes the area of contact between the fibers thusly preventing capture of the bubbles at the fusion points between the fibers and their resultant impingement upon the core surfaces.

In view of the problems associated with blemishes in fiber optics and the devices employed in the prior art toward their elimination it becomes obvious that any further improvements directed to the elimination of core surface distortion are of particular interest and significance to the industry. The Applicants have directed their attention to a novel process and product eliminating the formation of blemishes on the image surface of optical fiber conduits. The Applicants' invention is further directed to the maximizing of fiber density to an extent which heretofore has not been compatible with the prior art methods for the elimination of core deformation due to the creation of bubbles at the fusion surfaces. It must be noted that the Applicants' invention overcomes the practical problems involved with the fusion assembly of prior art devices directed to this same problem and permits the utilization of existing techniques in the production of optical fiber conduits. Prior art production techniques and processes disclosed in U.S. Pat. No. 2,980,957 entitled "Method and Apparatus for Use in the Fabrication of Light-Conducting Devices", J. W. Hicks, Jr., Inventor and U.S. Pat. No. 3,037,241 entitled "Method and Apparatus for Manufacturing Light-Conducting Devices", W. P. Bazinet, Jr., et al, Inventor, may be used in the practice of the Applicants' invention to satisfactorily produce optical fiber conduits providing maximized light transmission with minimum occurrence of blemishes.

It is therefore an object of the Applicants' invention to provide a fiber optic conduit of improved light transmission quality. It is another object of the Applicants' invention to provide a process for producing relatively blemish-free fiber optical conduits. It is another object of the invention to provide a relatively blemish-free fiber optical conduit. It is yet another object of this invention to provide a relatively blemish-free flexible fiber optic conduit.

SUMMARY OF THE INVENTION

Briefly, the Applicants' novel contribution to the art contemplates a method for producing an improved bundle of optical fibers. A plurality of monofiber cores are clad with a first material of lower refractive index relative to the core. The clad plurality of cores are then clad with a second material displaying a lower viscosity relative to the core and first cladding material. After the plurality of cores are clad with the specified first and second materials, they are fused into an assembly of selected dimension; the second cladding material has a cross-sectional area providing a minimum-free space within the fused assembly thereby producing a relatively blemish-free bundle of optical fibers.

In yet another aspect, the Applicants' invention contemplates a bundle of optical monofibers which is made up of a plurality of cores of selected material and dimension. These cores are clad with a first material having a refractive index providing substantially total internal reflection within the body of the cores. A second core cladding of selected material, having a lower viscosity than the core and the first cladding, has a cross-sectional area selected to insure or provide a certain predetermined minimum of free space within the final bundle of optical monofibers when the total assembly of clad cores is fused and drawn to a desired dimension. The minimum free space allows migration of bubbles formed at the point of fusion between adjacent fibers away from the core surfaces thereby providing a relatively blemish-free bundle of optical fibers.

For a better understanding of the present invention together with other and further objects thereof, reference is had to the following description taken in connection with the accompanying drawings while its scope will be pointed out in the appended claims.

BRIEF DESCRIPTION OF THE DRAWINGS

These drawings are intended to be illustrative of the Applicants' invention and not delimiting of its scope. Standard symbols are used and like parts are indicated by the same number.

DESCRIPTION OF THE PREFERRED EMBODIMENTS

Figure 1:
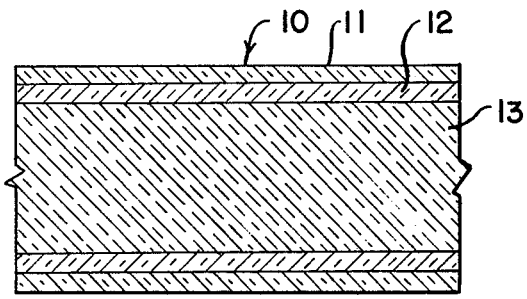
FIG. 1 is a diagrammatic cross-sectional view of a portion of a typical optical fiber conforming to the teachings of this invention.
Figure 2:
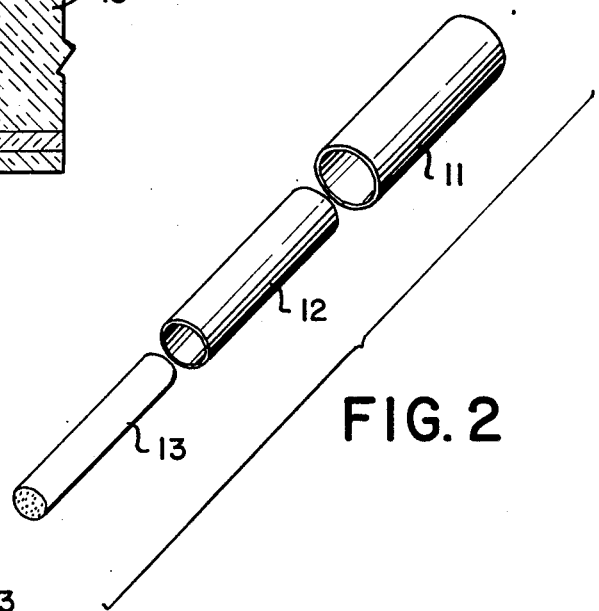
FIG. 2 is a diagrammatic functional perspective view indicating the assembly of a typical optical fiber of this invention.

The Applicants' invention as illustrated in FIGS. 1 and 2 shows a fiber optic glass core 13 on which is mounted a first cladding 12 which may be in the form of a concentric sleeve and a second cladding 11 which similarly is indicated as a concentric sleeve having an inner diameter approximately equal to the outer diameter of the first cladding 12. The relative illustrated dimensions of the first cladding 12, and second cladding 11, are distorted for ease of understanding but it must be appreciated that the core 13 is appreciably greater in dimension than either the first cladding 12 or the second cladding 11. Thus a typical optical fiber 10 of this invention would, in its practical implementation, display first and second claddings, 12 and 11 respectively, of much smaller dimension than the core 13. Specifically, it is noted that the radial thickness of the first cladding 12 need only be greater than one wavelength of transmitted light to achieve the necessary total internal reflection. The thickness of the second cladding 11 is limited by other factors which will be pointed out hereinafter. However, it is noted that this thickness is significantly less, even in its maximum extent, than the core 13 diameter.

Figure 3:
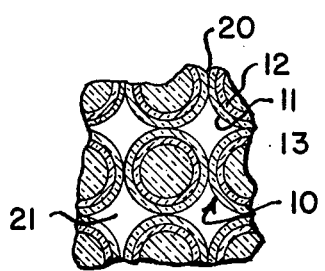
FIG. 3 is a diagrammatic radial cross-sectional view of a portion of an array of optical fibers in low density formation.
Figure 4:
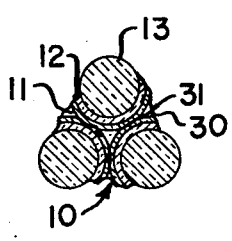
FIG. 4 is a diagrammatic cross-sectional view of a portion of optical fibers conforming to this invention shown in a close-packed low density array.
Figure 5:
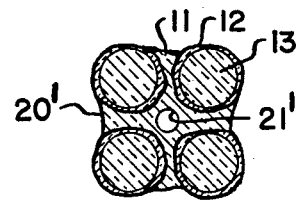
FIG. 5 is a diagrammatic radial cross-sectional view of the same optical fiber array as shown in FIG. 3 in a high density formation.

FIGS. 3, 4 and 5 show portions of typical arrays of optical fibers 10 conforming to the Applicants' invention. FIG. 3 illustrates a portion of a typical array 20 in a cross-sectional plane transverse to the axis of the array consisting of a plurality of optical fibers 10. The array portion 20 is shown in a low-density form prior to being drawn to the final dimensions, i.e. each optical fiber is shown in an undistorted fashion prior to fusion. In such low-density formation the cores 13 and the claddings 12 and 11 appear the same as prior to being placed into the array 20 and the optical fibers 10 are in point contact with each other at the surface of their second cladding 11. With the adjacent fibers 10 in true point contact, a free space 21 is provided. Obviously, as the fibers 10 are drawn together toward their ultimate final dimension the point contact between the second claddings 11 grows to a surface contact area and concomitantly the free space 21 shrinks, thereby resulting in an overall denser array. The free space 21 can be simply determined by calculating the overall cross-sectional area of the array as determined by its peripheral geometrical dimensions and subtracting from such cross-sectional area the composite cross-sectional area of the individual optical fibers 10.

FIG. 4 shows the same optical fibers 10 in a typical cross-section of a low-density optical fiber array 30. It is noted, however, in this low-density optical fiber array 30, the optical fibers 10 are inherently in a closer packed array than FIG. 3. Nevertheless, it is still clear that adjacent fibers are simply in point contact at the surface of their claddings 11 and that the free space 31 is determined in the same manner as outlined for the array of FIG. 3.

FIG. 5 is a typical presentation of an optical fiber array 20' after drawing to its final dimension. Array 20' is the development of array 20 when reaching its final dimensions. In this figure, it can be seen that both the core 13 and the first cladding 12 of the plurality of optical fibers 10 are changing shape toward an octagonal configuration, while the second claddings 11 have lost their annular shape and become essentially amorphous, filling out the free space which would normally be found in the low-density array. As shown in FIG. 5 and as can be determined empirically, the free space 21 of FIG. 3 now evolves to the free space 21' of FIG. 5, changing from an approximate rectangular shape to an approximately circular shape of decreased cross-sectional area.

Figure 6:
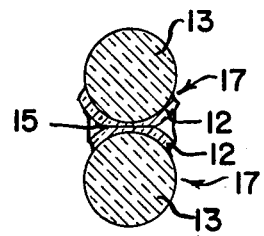
FIG. 6 is a diagrammatic radial cross-sectional view of two optical fibers of the prior art after fusion.

In FIG. 6 is shown, in cross-section, a typical array of prior art optical fibers after fusing and drawing to their ultimate dimension. As evidenced from the drawing, the optical fibers 17 comprise a core 13 and a single first cladding 12; when these fibers are drawn together during the fusion process, the point of contact between first cladding 12 go from a point contact to a surface contact. The formation of a surface contact between optical fibers enhances the possibility that bubbles formed by the vaporization of inclusions will migrate toward the optical core 13 causing distortion of its surface with concomitant loss of internal light.

Figure 7:
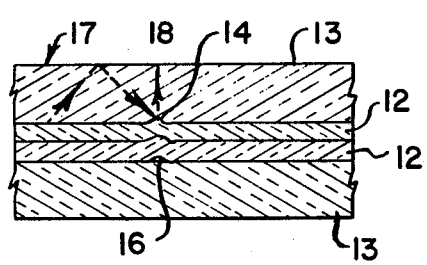
FIG. 7 is a diagrammatic cross-sectional longitudinal view of an optical fiber as used in FIG. 6.

FIG. 7 is a cross-section of the optical fibers of FIG. 6. The perturbation 14 shown on the internal surface of the first cladding 12 is a typical deformation of the core 13 surface caused by the vaporization of contaminants or inclusions resulting in the formation of a bubble 16. As can be seen from FIG. 7, the bubble having no place to migrate or escape must impinge upon the surface of the core 13 and upset its configuration at least to some minimum extent. A typical light ray 18 traveling down the core contacts the deformed surface at an angle of incidence less than the critical angle and results in the reflection of the ray transversely across the core 13 and thence through the opposite surface with its ultimate loss. This constitutes the typical process for the formation of blemishes with deleterious effect on the image transmitted through the optical cores. The Applicants' invention overcomes this serious limitation of the prior art by adding a second cladding to the optical fibers 17 in accordance with specified criteria.

As indicated, supra, during the assembly, namely the fusion and drawing, of a bundle or array of optical fibers to their ultimate and desired dimension, entrapped air and volatile particles give rise to the formation of bubbles or voids within the body of the array, i.e., either within the core or the claddings. When these voids or bubbles have no free space toward which to migrate, they will eventually, at least on a statistical basis, impinge on the surface of the core causing the formation of an irregular protrusion and an ultimate loss of an internally reflected ray of light.

In accordance with the Applicants' invention, FIG. 1 demonstrates a fiber optical core 13 made of clear optical glass or other suitable light transmitting material jacketed by a first cladding 12 which is an optical glass of a lower index of refraction than the core 13. The lower index of refraction permits the total internal reflection of rays transmitted essentially longitudinally along the core 13 when such rays have an angle of incidence greater than a predetermined critical angle, which angle is dependent upon the relative indices of refraction of the core 13 and the first cladding 12. This second cladding 11 is again a glass of suitable optical qualities and may comprise a black glass or light absorbing glass when desirable for particular functional requirements. However, the important parameter of this second cladding 11 material is that it has a lower viscosity than either the core 13 or the first cladding 12 so as to permit migration of bubbles within its body as opposed to impinging upon the first cladding 12 or the core 13. It is also significant to note that the second cladding 11 may be fabricated from an acid leachable glass or acid solvent glass which upon utilization of well known processes might be employed in the fabrication of flexible fiber optic conduits. The Applicants' invention finds particular applicability to flexible fiber optics in that the use of the acid soluble second cladding permits etching to take place along longitudinal or axially located channels within the body of the fiber as opposed to attacking the array in a radially directed fashion. This longitudinal progress of the acid leaching compound produces a faster etching away of the second cladding and a more uniform removal of the second cladding material from the bundle thus producing a more wear-resistant bundle particularly at its distal and proximal ends.

FIG. 2 demonstrates the assembly of a typical optical fiber 10 employing tubes 12 and 11, of selected material and parameters to form the first and second claddings respectively (the claddings may be coated on the core or placed on by other suitable techniques). The outer diameter of the core 13 and the inner diameter of the first cladding 12 are of approximately the same dimension as are the complementary diameters of the first cladding 12 and the second cladding 11. As is clearly pointed out in the referenced U.S. Pat. Nos. 2,980,957 and 3,037,241, the core 13, first cladding 12 and second cladding 11, may be assembled and drawn at particular temperatures to a desired dimension. The optical fiber 10 is first drawn to a selected dimension and then placed in assembly with a plurality of similar optical fibers 10 in either a close-packed array or a standard array as depicted in FIGS. 4 and 3 respectively. After assembly or arrangement, the plurality of assembled optical fibers 10 are then drawn in steps at specified temperatures, to their ultimate dimensions. Depending on functional requirements, the drawn assemblies may be assembled into a larger assembly and again fused and drawn to dimension.

The selected temperatures and the dimensions of the draw determine the forces which act upon the arrays and which eventually affect a distortion of the periphery of the cores 13 and first and second claddings 12 and 11 respectively. FIG. 3 shows the optical fibers 10 assembled prior to drawing while FIG. 5 shows the same optical fibers 10 drawn in such a manner that the acting forces cause distortion of the cores and claddings.

The use of a lower viscosity material for second cladding 11 permits the bubbles or voids which are formed at or near the contact surfaces of adjacent optical fibers 10 to be entrained within the second cladding 11 material and migrate in a path of least resistance ultimately reaching a void or free space depicted by aperture 21' of FIG. 5. The aperture or channel 21' is in reality a void that runs longitudinally through the length of the optical fiber conduit and is typical of the free spaces that are formed along the interstices of the plurality of adjacent optical fibers 10 throughout the entire bundle or array. Heretofore, although second claddings were used for other purposes, it was thought necessary, and in fact almost universally implemented, that the entire cross-section of the optical fiber bundle be closed by the core, first cladding, and second cladding material. Thus, the applicants provide a concept for the practical production of high density relatively blemish-free optical fiber conduits which was never recognized or suggested by the prior art.

In selecting the material of which the second cladding 11 is to be fabricated, it is essential that the viscosity of this material be appreciably less than either that of the core 13 or the first cladding 12. This lower viscosity permits changing of the shape of the first cladding 11 from that of a well-defined annular cross-section to an essentially amorphous structure. Thus, as the fiber optic bundle 21 of FIG. 3 is reduced toward its final geometrical shape as depicted in fiber optic bundle 20' of FIG. 5, the second cladding material 11 moves and distorts thus reducing the free space 21 to that of 21', and to some degree lessening the forces causing distortion of the core 13 and first cladding 12. The lower viscosity of the second cladding 11 further permits the voids or bubbles formed at the contacting surfaces or the near contacting surfaces of adjacent optical fibers 10 to travel within the body of the second cladding 11 material toward the free space 21' which upon its entry therein is free to expand without causing damage to the core 13 surface. Of course, the viscosity of the second cladding 11 material must be of sufficient magnitude to maintain its general geometry throughout the fusion and drawing process. By this is meant that without the exertion of inwardly directed forces due to the drawing of the optical fiber bundle than the second cladding 11 material must maintain its approximate original shape.

A salient feature of the applicants' invention with regard to the second cladding 11 material is the selection of its cross-sectional area commensurate with maintaining a predetermined minimum free space when the fused assembly is brought or drawn to its final dimensions. In selecting this cross-sectional area, the radial dimension of the annular ring comprising the second cladding 11 is chosen to provide a certain free area 21 when the plurality of optical fibers 10 are free (i.e. prior to drawing) in their desired geometrical pattern. It is presumed that when compressed to their final dimension, the free area 21' will be sufficient to achieve the elimination of core 13 deformations and to provide leaching channels for the production of flexible optical conduits. The area of the second cladding 11 as a percentage of the normal free area of a free assembled optical fiber bundle is, of course, finally determined on an empirical basis, i.e., the amount of material that will give to fiber optic bundles sufficient strength and ease of handling while still permitting the reduction or minimization of optical blemishes and ease of leaching when such is the case.

The following example will make clear the guiding parameters in the carrying out of the applicants' novel process:

EXAMPLE

Requirement: Approximately ⅛ in. square bundle of optical fibers with 0.001 in. elements (optical fiber 10);
Core Material: Barium flint glass;
First Cladding: Soda-lime glass;
Second Cladding: Soda-lead glass.

Note 1

The barium flint glass has a refractive index of approximately 1.6 and a softening point at approximately 700° C. The soda-lime glass has a refractive index of 1.52 and softening point at approximately 700° C, the soda-lead glass has a refractive index of 1.56 and a softening point at 635° C. (When a flexible or leachable bundle of optical fibers or optical fiber conduits is desired, an acid soluble glass may be substituted for the lead glass).

First Draw: Optical monofibers drawn to approximately 0.1 inch O.D.

Second Draw: Optical Multifiber Assembly comprising a plurality of monofibers in a 10 × 10 square array drawn to a multifiber approximately 0.1 inch square.

Third Draw: Multi-multi fiber assembly consisting of 12 × 12 square array of Optical Multifiber Assemblies of Second Draw, drawn to approximately ⅛ inch square.

Note 2

In the above example the theoretical free space, i.e. without second cladding, was approximately 22 percent of the entire cross-sectional area of the assembly in its final geometric pattern and dimension. The overcladding or second cladding material was selected to have a cross-sectional area approximately equal to 15 percent of the total cross-sectional area of the final geometrical pattern thereby leaving a theoretical free space of 7%. The optical fiber conduit conforming to the above specifications provided a relatively blemish-free image. It was assembled and drawn using normal fabrication techniques and processes.

In the foregoing example, a theoretical free space of seven percent was found to provide a blemish-free optical fiber conduit. It has been determined that a free space as low as three percent will also lend improvements to the optical fiber assembly. Therefore, since the ultimate determination as to the necessary free space is empirical, the applicants do not wish to be bound by the percentages herein specified, but, rather recognize that free space percentages differing from the specified values may produce optical fiber conduits conforming to their invention.

When using the second cladding in a flexible optical fiber conduit, it must be an acid soluble glass susceptable to being etched out of the drawn bundle. Accordingly, after drawing the bundle to its final dimension, opposite ends of the drawn bundle may be potted to enclose and maintain the geometrical patterning of the individual fiber ends of the conduit. This potting fills air spaces between the fibers before leaching. When an epoxy potting composition is used, the conduit is heated sufficiently to cause the epoxy to flow into the air spaces and then the entire end of the conduit is covered with the epoxy. This prevents etching of the outermost leachable glass second cladding 11 as well as end portions thereof.

After the application of epoxy, wax or other acid-resistant material to the ends of the conduit, it is leached by immersion in acid using an acid soluble glass for second cladding 11 consisting for example of 45 percent $B_2O_3$, about 45 percent BaO and about 8 to 10 percent $La_2O_3$, etching may be accomplished with hydrochloric acid. Due to the formation of free channels corresponding to free space 21' the acid proceeds to etch along the interstices of the fiber optic bundle in axial directions. This axial leaching not only speeds the process but prevents the formation of a cone of second cladding material 11 at the object and image ends of the flexible optical fiber conduit which would have deleterious effect upon the realibility and life characteristics of the product. The optical fiber conduit may be arranged in any geometrical cross-sectional shape appropriate to the end use of the product, which geometry is in no way limited by the practice of the applicants' novel processes.

In sum, the applicants provide a novel process and product in which a plurality of monofiber cores 13 are clad with a first material 12 of lower refractive index and a second cladding 11 of lower viscosity material. The clad plurality of cores 13 are assembled and fused into a desired geometrical shape and drawn to a final dimension. The cross-sectional area of the second cladding 11 material is selected to provide a minimum free space 21' in the final fused assembly thereby allowing the bubbles or voids formed by vaporized inclusions of trapped air to migrate toward the free space rather than impinging upon the core surfaces.

It is intended by the applicants that this disclosure and the illustrative embodiments presented be exemplary of their invention and not the delimiting of its scope. All those modifications and changes apparent to those skilled in the art are considered to be within the scope of this invention.

We claim:
1. A drawn bundle of optical fibers comprising:
   a plurality of cores of selected material and dimension;
   a first core cladding having a refractive index providing substantially total internal reflection within said cores;
   a second core cladding disposed on said first core cladding having a viscosity lower than the viscosity of said core and first core cladding and having a cross-sectional area selected to provide at least a minimum free space of cross-sectional area unoccupied by said core and said first and second cladding within said drawn bundle for substantially eliminating optical fiber blemishes and preventing fiber distortion while providing channeling between the optical fibers;
   said bundle being fused by the second core cladding deformed by said drawing to an extent to provide said minimum free space in said cross-sectional area unoccupied by said core and said first and second cladding.

2. The bundle of optical fibers of claim 1 wherein the cross-sectional area of the second cladding material is approximately 7 percent less than the difference of the cross-sectional area of the drawn bundle and the cross-sectional area of the core and first core cladding, said thickness of said first cladding material is at least equal to approximately the wavelength of light transmitted through said optical fibers, and the softening point in centigrade scale of said second cladding material is approximately 10 percent below that of said core and said first cladding material.

3. The bundle of optical fibers of claim 2 wherein said core is a flint glass, said first cladding material is a soda lime glass.

4. The bundle of claim 1 wherein the second cladding material is an acid soluble glass.

* * * * *